US008671534B2

(12) United States Patent
Huang

(10) Patent No.: US 8,671,534 B2
(45) Date of Patent: Mar. 18, 2014

(54) UNIVERSAL CLUTCH ALIGNMENT TOOL

(75) Inventor: Chia-Hao Huang, Taiping (TW)

(73) Assignee: Poul Chang Metal Industry Co., Ltd., Taichung County (TW)

(*) Notice: Subject to any disclaimer, the term of this patent is extended or adjusted under 35 U.S.C. 154(b) by 523 days.

(21) Appl. No.: 13/012,803

(22) Filed: Jan. 25, 2011

(65) Prior Publication Data

US 2012/0186056 A1 Jul. 26, 2012

(51) Int. Cl.

*B25B 27/14* (2006.01)
*B25B 27/00* (2006.01)
*B23P 19/04* (2006.01)

(52) U.S. Cl.

USPC .................. 29/274; 29/278; 29/280; 29/255; 29/270

(58) Field of Classification Search

USPC ........... 29/255, 263, 270, 274, 278, 280, 258, 29/235, 264, 265, 724, 259, 260, 261, 262

See application file for complete search history.

(56) References Cited

U.S. PATENT DOCUMENTS 4,068,879 A * 1/1978 Torbet et al. .................... 294/89

* cited by examiner

*Primary Examiner* — Lee D Wilson
*Assistant Examiner* — Seahee Yoon

(57) ABSTRACT

An universal clutch alignment tool is provided. A tool rod is assembled with a connecting mechanism, and the connecting mechanism is then assembled with a positioning pipe, thereby forming a tool for assembling/disassembling a clutch. The connecting mechanism includes a sleeve, a driving rod, and connecting blocks. The sleeve is made into a hollow pipe in which a driving head at one end of the driving rod is disposed. The surface of the sleeve is formed with slots respectively arranged at an angular interval in which the connecting blocks are received. The outer surface of the driving head is formed with a conical driving slope. The middle section of each driving block is provided with a V-shaped notch. The inner walls on both sides of the notch are formed with two connecting slopes symmetrical to each other. The outer edge of the driving head is inserted into the notches of the connecting blocks, so that the tool rod drives the connecting blocks via the driving rod to generate a radial expansion or retraction, thereby allowing various kinds of clutches to be assembled or disassembled.

7 Claims, 5 Drawing Sheets

UNIVERSAL CLUTCH ALIGNMENT TOOL

BACKGROUND OF THE INVENTION

1. Field of the Invention

The present invention relates to an assembling tool, and in particular to an alignment tool for facilitating the attachment or detachment of a clutch.

2. Description of the Prior Art

A clutch of a motorcycle or an automobile is mounted between an engine and a transmission box, whereby the power output by the engine is transmitted to the transmission box via a crankshaft. The clutch is provided therein with a clutch disc. The clutch disc is gradually worn down by friction generated between a flywheel and a pressure plate in the clutch, so that the clutch disc has to be replaced periodically. Traditionally, the replacement of the clutch disc is carried out by the following steps: (1) detaching the engine from the chassis; (2) detaching the transmission box from the chassis; (3) detaching the clutch cover from the flywheel to thereby remove the clutch disc from the clutch; (4) replacing the clutch disc with a new one; (5) clamping the new clutch disc between a frictional surface of the flywheel and a surface of the pressure plate, putting the clutch cover on the flywheel, and aligning the axial hole of the clutch disc with the center of the flywheel (i.e. the center of the crankshaft); (6) mounting the clutch cover on the flywheel; (7) keeping the axial hole of the clutch consistent with the center of the flywheel, mounting the transmission box into the engine; and (8) mounting the engine to the chassis.

In the above-mentioned step (5), it is not easy to align the axial center of the clutch disc with the center of the flywheel. Thus, a special assembling took is needed. Please refer to FIG. 1. A conventional assembling tool 90 is formed at its front end with a front rod portion 91 and a middle rod portion 92. The front rod portion 91 and the middle rod portion 92 are of different diameters. In use, the front rod portion 91 is disposed through a flywheel 81 and then inserted into a shaft hole 821 of a crankshaft 82. The middle rod portion 92 is disposed through a shaft hole 831 of a clutch disc 83. In this way, the flywheel 81, the crankshaft 82 and the clutch disc 83 are positioned along the same axial center. However, in various kinds of motorcycles or automobiles, the shaft hole 831 of the clutch disc 83 and the shaft hole 821 of the crankshaft 82 are different in diameter. As a result, various kinds of assembling tools 90 have to be present in a garage, which makes it inconvenient to use and affects the assembling efficiency and quality of the clutch.

EP191550A2 discloses a conventional assembling tool having an expanding mechanism at its middle section for adjusting the outer diameter of the assembling tool. The expanding mechanism is configured to abut against the shaft hole of the clutch disc. The expanding mechanism is constituted of an operating rod and a conical sleeve. The front end of the operating rod is provided with a claw portion of a larger diameter. A plurality of slots extends from an end edge of the claw portion to the middle section of the other end of the operating rod. The inner edge of the claw portion is formed with an inner conical surface corresponding to the outer edge of the conical sleeve, whereby the rear end of the conical sleeve can be assembled in the claw portion. Further, the front end of this conventional assembling tool is provided with positioning claws capable of generating a radial expansion or retraction for abutting against the shaft hole of the crankshaft. The positioning claws are constituted of three claws combined together with a plastic sheath. The positioning claws are positioned to correspond to the inner edge of the conical sleeve and formed into an inner slope to correspond to its outer conical surface. In assembly, the front end of the conical sleeve is exactly disposed in the positioning claws.

With this structure, when the operating rod is pushed by related component provided at its rear end, the front end and the rear end of the conical sleeve are simultaneously located in the positioning claws and the expanding claws. The provision of the slope allows the positioning claws and the expanding claws to generate a radial expansion, thereby contacting the shaft holes of the crankshaft and the clutch disc. However, such a structure has the following problems:

(I) The operating rod is a rigid body, and only the expanding claws and the front section of the operating rod are provided with slots. If the shaft hole of the clutch disc is large, a greater force is needed for expanding the large-diameter expanding claws. Further, the repeated expansion and retraction of the expanding claws may cause fatigue of the rigid operating rod. Since the expansion of the expanding claws is caused by the forward abutment of the conical sleeve against the positioning claws, such a process may be carried out in a less smooth and steady manner.

(II) The positioning claws are exposed to the outside, so that the plastic sheath is used to combine the positioning claws together. However, the plastic sheath is brought into frictional contact with the components in the clutch for a long period of time, so that the plastic sheath may become worn and broken. Further, the repeated expansion of these claws may cause elastic fatigue in the plastic sheath.

In view of the above, the present inventor proposes a novel and reasonable structure based on his expert experience and delicate researches.

SUMMARY OF THE INVENTION

In order to solve the above problems, an objective of the present invention is to provide a universal clutch alignment tool, whereby different kinds of clutch discs can be assembled or disassembled by using one assembling tool. Thus, the efficiency and quality of assembling the clutches is improved greatly.

In order to achieve the above objective, the present invention provides a universal clutch alignment tool, which includes a tool rod, an adjustment nut, a connecting mechanism and a positioning pipe. The adjustment nut, the connecting mechanism and the positioning pipe are assembled at a front end of the tool rod. The tool rod is an elongate rod having an outer threaded section on its front end. The outer threaded section is threadedly combined with one end of an adjustment nut. The other end of the adjustment nut is threadedly combined with the connecting mechanism. The connecting mechanism comprises a sleeve, a driving rod, and a plurality of connecting blocks. The sleeve is made into a hollow pipe in which one end of the driving rod is disposed. The surface of the sleeve is formed with a plurality of slots that are respectively arranged at an angular interval. The connecting blocks are received in the slots respectively. The inner walls of both ends of the sleeve are formed with a first inner threaded portion and a second inner threaded portion respectively. The first inner threaded portion is threadedly combined with the corresponding end of the adjustment nut. The second inner threaded portion is threadedly combined with one end of the screw rod. The other end of the screw rod is threadedly combined with the positioning pipe. The driving rod is driven by one end of the tool rod to move. The driving rod is provided with a driving head of a larger diameter located at one end of the sleeve. At least one outer surface of the driving head is formed with a conical driving slope. The middle section of each driving block is provided with a notch. The inner walls on both sides of the notch are formed with two connecting slopes symmetrical with each other. When the driving head of the driving rod is disposed in the sleeve, the outer edge of the driving head is inserted into the notches of the connecting blocks, so that the driving slopes abut against the connecting slopes. Thus, the driving rod driven by the tool rod can drive the connecting blocks to generate a radial expansion or retraction, thereby allowing various kinds of clutches to be assembled or disassembled. A bushing and an elastic element forms a group. One group is provided between one end of the sleeve and the adjustment nut. The other group is disposed between one end of the sleeve and the inner edge of the positioning pipe. One end of each bushing is inserted into the edges of the connecting blocks, and the other end of the bushing abuts against the elastic element. The other end of the elastic element abuts against the end surfaces of the adjustment nut and the positioning pipe. With this structure, the process of the driving rod of the tool rod for driving the connecting blocks can be carried out more smoothly.

The technique, methods and functions of the present invention will be described in more detail with reference to a preferred embodiment thereof shown in the accompanying drawings. Thus, the above objectives, structure and characteristics of the present invention can be better understood.

DETAILED DESCRIPTION OF THE INVENTION

Figure 1:
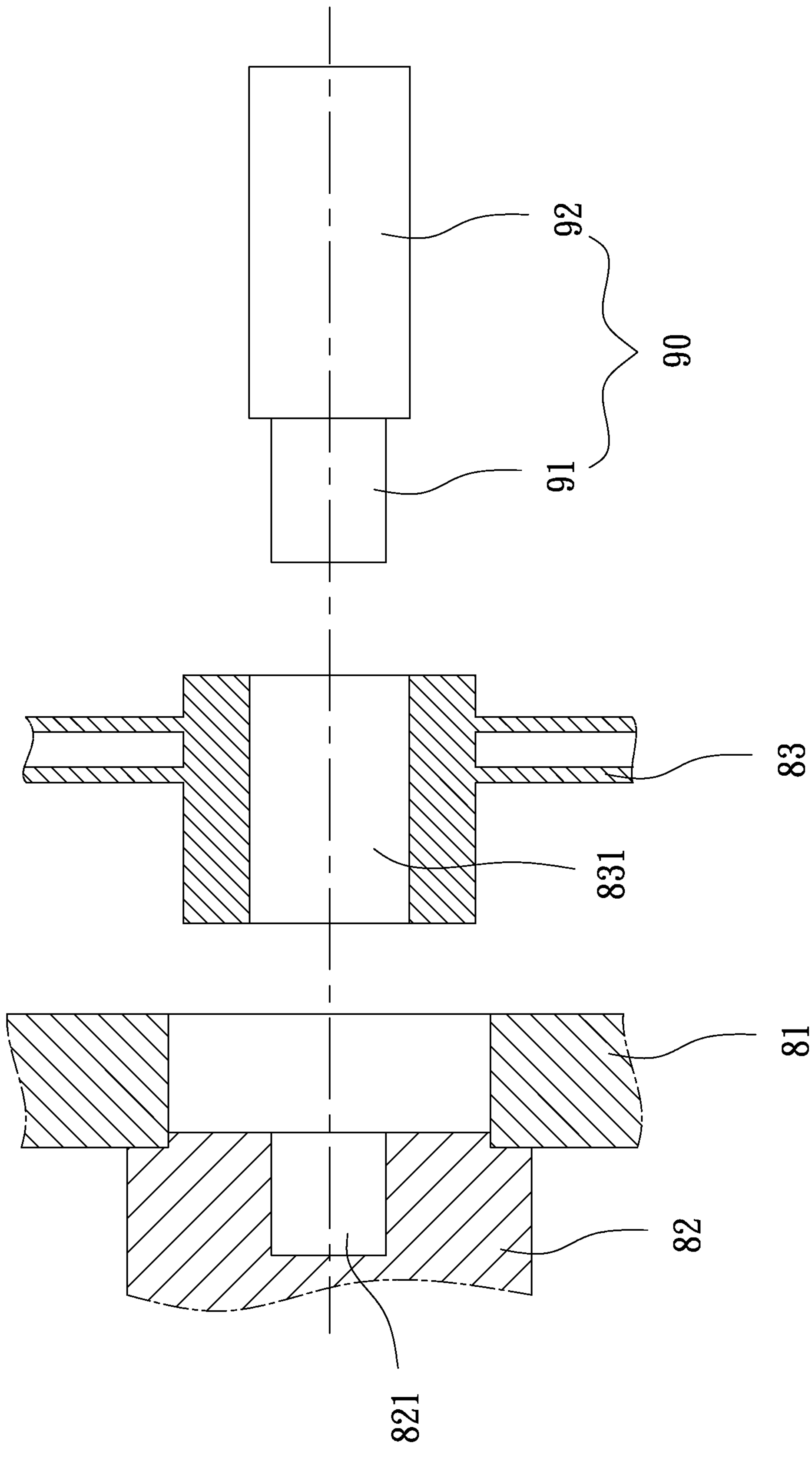
FIG. 1 PRIOR ART
FIG. 1 is a schematic view showing the operation of a conventional clutch tool.
Figure 2:
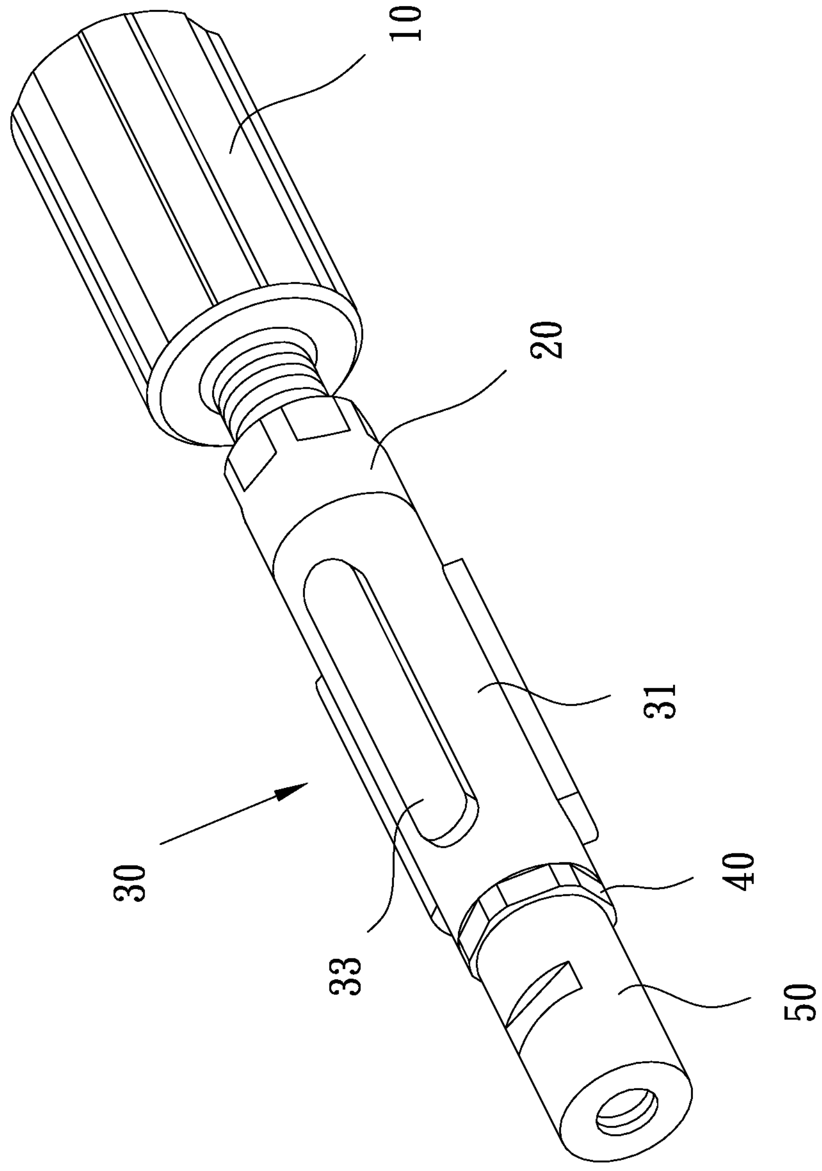
FIG. 2 is an assembled perspective view of the present invention.
Figure 3:
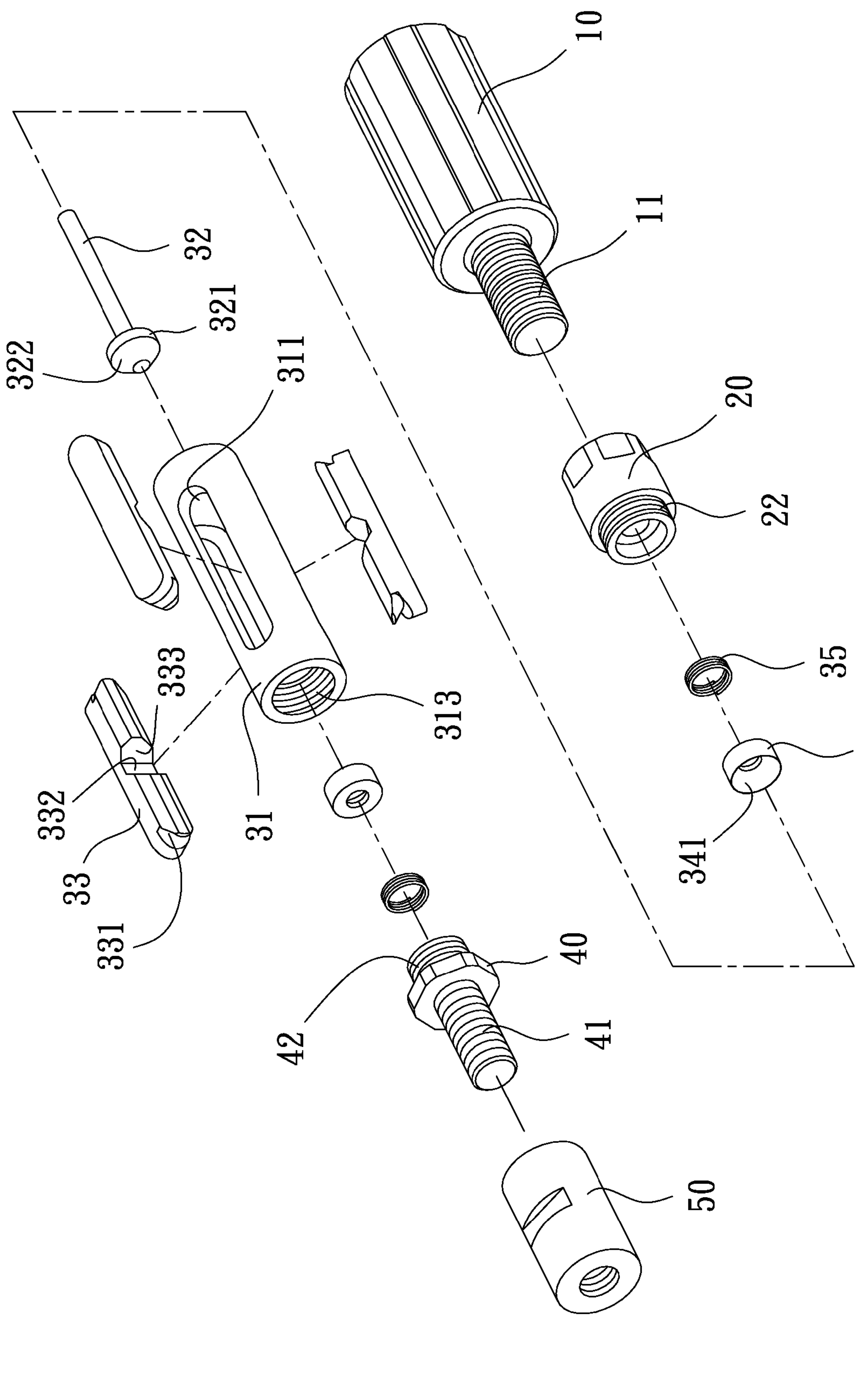
FIG. 3 is an exploded perspective view of the present invention.

Please refer to FIGS. 2 to 5. The present invention relates to a universal clutch alignment tool, which includes a tool rod 10, an adjustment nut 20, a connecting mechanism 30, a screw rod 40, and a positioning pipe 50. The adjustment nut 20, the connecting mechanism 30, the screw rod 40 and the positioning pipe 50 are sequentially assembled at a front end of the tool rod 10. With this structure, an assembling tool for assembling or disassembling a clutch is obtained.

The tool rod 10 is an elongate rod. One end of the tool rod 10 is configured to be held by a user, and the other end is provided with an outer threaded section 11 for threadedly combining with the adjustment nut 20.

An inner edge of one end of the adjustment nut 20 corresponding to the tool rod 10 is formed with an inner threaded hole 21 for threadedly combining with the outer threaded section 11. The other end of the adjustment nut 20 is formed with an outer threaded portion 22 for threadedly combining with the connecting mechanism 30.

The connecting mechanism 30 includes a sleeve 31, a driving rod 32, a plurality of connecting blocks 33, a bushing 34 and an elastic element 35.

The sleeve 31 is formed into a hollow pipe for allowing one end of the driving rod 32 to be disposed therein. The middle section of the surface of the sleeve 31 is formed with a plurality of slots 311 respectively arranged at an angular interval for allowing the connecting blocks 33 to be received therein. The inner walls of both ends of the sleeve 31 are formed with a first inner threaded portion 312 and a second inner threaded portion 313 respectively. The outer threaded portion 22 of the adjustment nut 20 is threadedly combined with the first inner threaded portion 312. One end of the screw rod 40 is threadedly combined with the second inner threaded portion 313.

The driving rod 32 is formed into a rod having a protrusion at an end. One end of the driving rod 32 is drivingly connected to the tool rod 10, so that the driving rod 32 can be driven by the tool rod 10 to move. The other end of the driving rod 32 is a driving head 321 of a larger diameter located in the sleeve 31. The outer surfaces of two opposite sides of the driving head 321 are respectively formed into a conical driving slope 322 for drivingly connecting to the connecting blocks 33.

The connecting blocks 33 are disposed in the slots 311 of the sleeve 31. Each of the connecting blocks 33 is formed into an elongate block. The outer edges of both ends of each connecting block 33 are formed into a conical end slope 331 respectively. The middle section of the connecting block 33 is provided with a V-shaped notch 332. The inner walls of both sides of the notch 332 are formed into two connecting slopes 332 symmetrical with each other. When the driving head 321 of the driving rod 32 is disposed in the sleeve 31, the outer surface of the driving head 321 is inserted into the notch 332 of the connecting block 33 with the driving slope 322 abutting against the connecting slope 333. In this way, when the driving rod 32 is driven by the tool rod 10, the connecting blocks 33 are synchronously driven to generate a radial expansion or retraction.

The inner edge of one end of the bushing 34 corresponding to the connecting block 33 is formed with a conical hole 341. The elastic element 35 is a compression spring having an elastic restoring force. A bushing 34 and an elastic element 35 form a group. One group is disposed between the sleeve 31 and the inner edge of the adjustment nut 20. The other group is disposed between the sleeve 31 and the screw rod 40. The conical hole 341 of the bushing 34 abuts against the connecting slopes 333 of the connecting blocks 33. Two ends of the elastic element 35 abut between the end surface of the bushing 34 and the adjustment nut 230 (or the screw rod 40). With this structure, the movement of the connecting blocks 33 driven by the driving rod 32 is more smooth and steady.

The screw rod 40 is a conventional screw rod. Both ends of the screw rod 40 are provided with a first outer threaded end 41 and a second outer threaded end 42 respectively. The first outer threaded end 41 is threadedly combined with the positioning pipe 50. The second outer threaded end 42 is threadedly combined with the second inner threaded portion 313 of the sleeve 31.

The outer diameter of the positioning pipe 50 is equal to the inner diameter of the shaft hole 611 of the crankshaft 61. The positioning pipe 50 is threadedly combined with the first threaded end 41 of the screw rod 40.

With the above constituents, the driving rod 32 of the connecting mechanism 30 drives the connecting block 33 to generate radial expansion or retraction. Further, the bushing 34 together with the elastic element 35 enables the assembling tool to be universally used in assembling or disassembling different kinds of clutches. Also, the present invention has a compact structure to thereby enhance the efficiency and quality of its operation.

Figure 4:
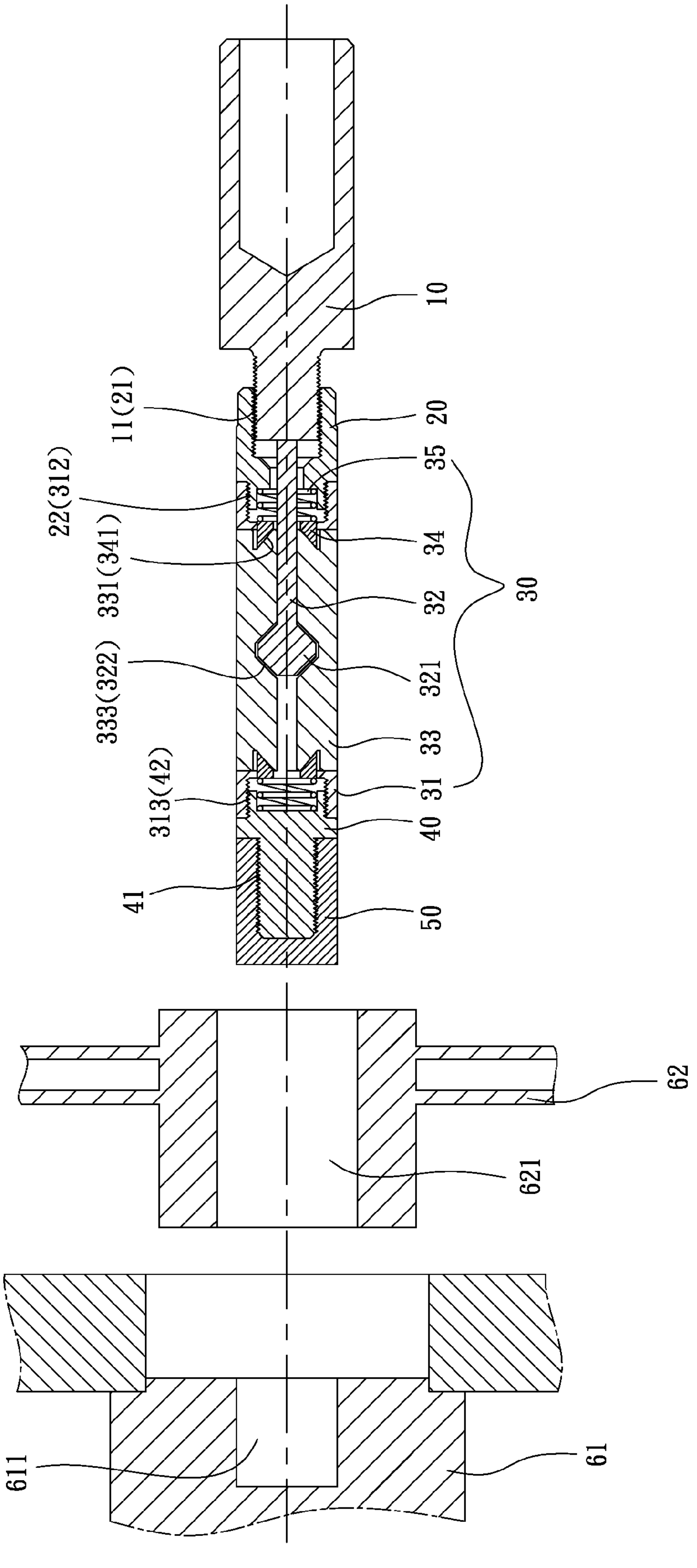
FIG. 4 is an assembled cross-sectional view of the present invention before use.
Figure 5:
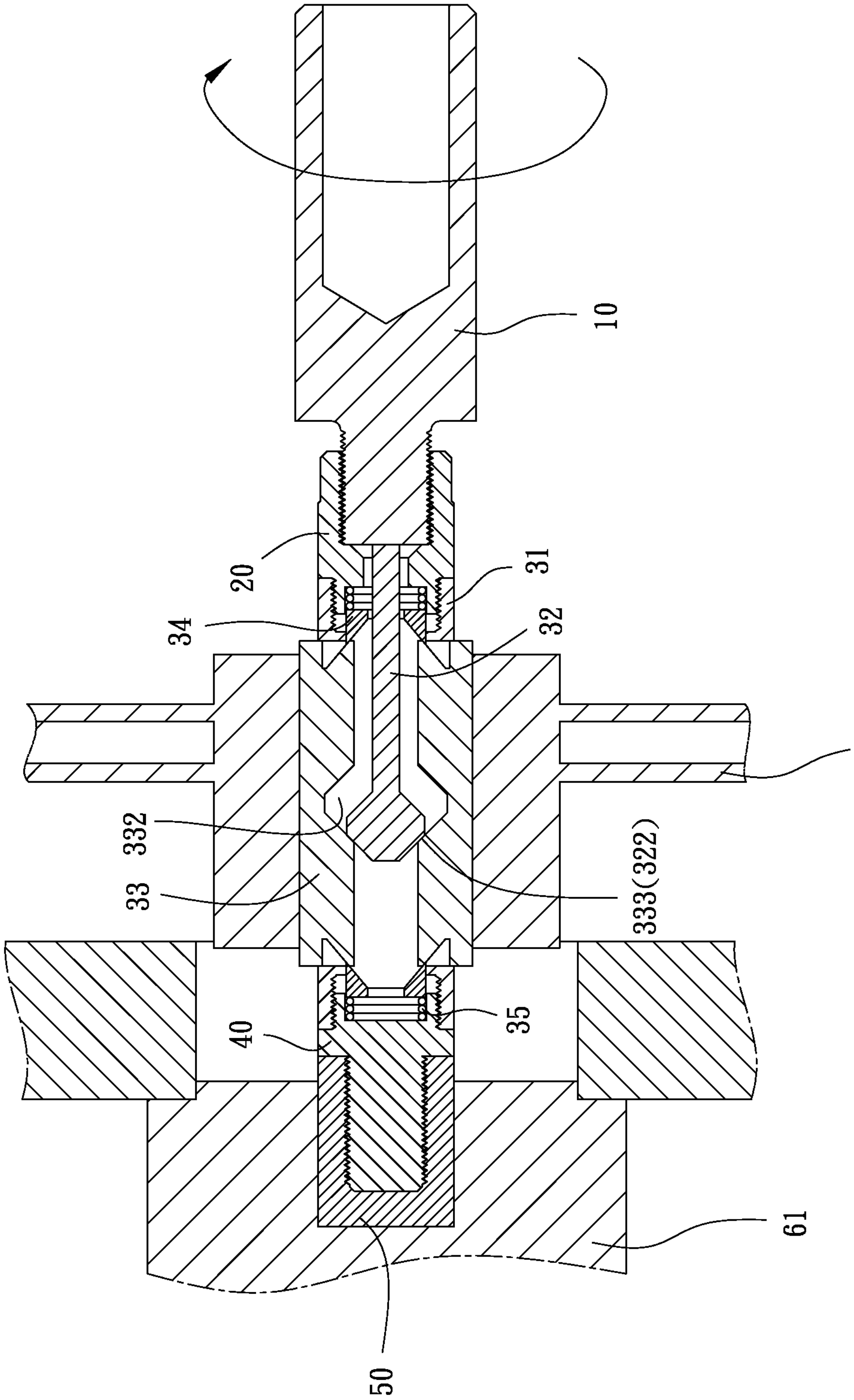
FIG. 5 is an assembled cross-sectional view of the present invention after use.

Please refer to FIGS. 4 and 5. In use, if the inner diameter of the shaft hole 621 of the clutch disc 62 is larger than the outer diameter of the sleeve 31, the user only needs to rotate the tool rod 10, so that the tool rod 10 pushes the driving rod 32 to move. Then, the driving head 321 drives the connecting blocks 33 to expand radially until the outer surfaces of the connecting blocks 33 abut against the inner surface of the shaft hole 621. In this way, the assembling tool can be aligned with the shaft hole 621, so that the assembly of various kinds of clutches becomes much easier.

According to the above, the present invention really demonstrates novelty, inventive steps and practicability, and it has not been used in public or disclosed in any prior art reference. Therefore, the present invention conforms to the requirements for an invention patent.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A universal clutch alignment tool, including a tool rod as well as a connecting mechanism and a positioning pipe assembled at a front end of the tool rod, the universal clutch alignment tool being configured to assemble and disassemble a clutch and characterized in that:

the connecting mechanism includes a sleeve, a driving rod and a plurality of connecting blocks, the sleeve is made into a hollow pipe in which one end of the driving rod is disposed, a surface of the sleeve is formed with a plurality of slots that are respectively arranged at an angular interval, with the connecting blocks received in the slots respectively;

the driving rod is driven by one end of the tool rod to move, the driving rod is provided with a driving head of a larger diameter located at one end of the sleeve, and at least one outer surface of the driving head is formed with a conical driving slope; and a middle section of each connecting block is provided with a notch, inner walls on both sides of the notch being formed with two connecting slopes symmetrical to each other:

wherein when the driving head of the driving rod is disposed in the sleeve, the outer surface of the driving head is inserted into the notches of the connecting blocks, so that the driving slopes abut against the connecting slopes, the driving rod driven by the tool rod can thus drive the connecting blocks to generate a radial expansion or retraction, thereby allowing various kinds of clutches to be assembled or disassembled; and wherein one end of the sleeve of the connecting mechanism is combined with the tool rod through an adjustment nut, and the other end of the sleeve is combined with the positioning pipe through a screw rod.

2. The universal clutch alignment tool according to claim 1, wherein an inner wall of one end of the sleeve corresponding to the tool rod is formed with a first inner threaded portion threadedly combined with an outer threaded portion of the adjustment nut, an inner wall of the other end of the adjustment nut is provided with an inner threaded hole, an outer threaded section protruding from one end of the tool rod, and the outer threaded section is threadedly engaged within the inner threaded hole, thereby combining the tool rod with the adjustment nut.

3. The universal clutch alignment tool according to claim 1, wherein an inner wall of one end of the sleeve corresponding to the positioning pipe is formed with a second inner threaded portion, both ends of the screw rod are provided with a first outer threaded end and a second outer threaded end respectively, the first outer threaded end threadedly combined with the positioning pipe, and the second outer threaded end is threadedly combined with the second inner threaded portion of the sleeve.

4. A universal clutch alignment tool, including a tool rod as well as a connecting mechanism and a positioning pipe assembled at a front end of the tool rod, the universal clutch alignment tool being configured to assemble and disassemble a clutch and characterized in that:

the connecting mechanism includes a sleeve, a driving rod and a plurality of connecting blocks, the sleeve is made into a hollow pipe in which one end of the driving rod is disposed, a surface of the sleeve is formed with a plurality of slots that are respectively arranged at an angular interval, with the connecting blocks received in the slots respectively;

the driving rod is driven by one end of the tool rod to move, the driving rod is provided with a driving head of a larger diameter located at one end of the sleeve, and at least one outer surface of the driving head is formed with a conical driving slope; and a middle section of each connecting block is provided with a notch, inner walls on both sides of the notch being formed with two connecting slopes symmetrical to each other;

wherein when the driving head of the driving rod is disposed in the sleeve, the outer surface of the driving head is inserted into the notches of the connecting blocks, so that the driving slopes abut against the connecting slopes, the driving rod driven by the tool rod can thus drive the connecting blocks to generate a radial expansion or retraction, thereby allowing various kinds of clutches to be assembled or disassembled; and wherein one end of the sleeve of the connecting mechanism is threadedly combined with the tool rod through an adjustment nut, a bushing and an elastic element are disposed between the sleeve and the adjustment nut, an end of the bushing is inserted into the edges of the connecting blocks, another end of the bushing abuts against one end of the elastic element, and the other end of the elastic element abuts against an end surface of the adjustment nut, whereby the tool rod drives the connecting blocks via the driving rod.

5. The universal clutch alignment tool according to claim 4, wherein an outer edge of each connecting block corresponding to the bushing is formed with a conical slope, an inner edge of the bushing is formed with a conical hole, and the conical hole of the bushing is engaged with the conical slopes of the connecting blocks.

6. A universal clutch alignment tool, including a tool rod as well as a connecting mechanism and a positioning pipe assembled at a front end of the tool rod, the universal clutch alignment tool being configured to assemble and disassemble a clutch and characterized in that:

the connecting mechanism includes a sleeve, a driving rod and a plurality of connecting blocks, the sleeve is made into a hollow pipe in which one end of the driving rod is disposed, a surface of the sleeve is formed with a plurality of slots that are respectively arranged at an angular interval, with the connecting blocks received in the slots respectively;

the driving rod is driven by one end of the tool rod to move, the driving rod is provided with a driving head of a larger diameter located at one end of the sleeve, and at least one outer surface of the driving head is formed with a conical driving slope; and a middle section of each connecting block is provided with a notch, inner walls on both sides of the notch being formed with two connecting slopes symmetrical to each other;

wherein when the driving head of the driving rod is disposed in the sleeve, the outer surface of the driving head is inserted into the notches of the connecting blocks, so that the driving slopes abut against the connecting slopes, the driving rod driven by the tool rod can thus drive the connecting blocks to generate a radial expansion or retraction, thereby allowing various kinds of clutches to be assembled or disassembled; and wherein one end of the sleeve of the connecting mechanism is threadedly combined with the positioning pipe with a screw rod, a bushing and an elastic element are disposed between the sleeve and the positioning pipe, an end of the bushing is inserted into the edges of the connecting blocks, another end of the bushing abuts against the elastic element, and another end of the elastic element abuts against an end surface of the screw rod, whereby the tool rod drives the connecting blocks via the driving rod.

7. The universal clutch alignment tool according to claim 6, wherein an outer edge of each connecting block corresponding to the bushing is formed with a conical slope, an inner edge of the bushing is formed with a conical hole, and the conical hole of the bushing is engaged with the conical slopes of the connecting blocks.

* * * * *